United States Patent
Yamazaki et al.

(10) Patent No.: US 7,853,654 B2
(45) Date of Patent: Dec. 14, 2010

(54) MASS MAIL DETECTION SYSTEM AND MAIL SERVER

(75) Inventors: Katsuyuki Yamazaki, Saitama (JP); Hiromitsu Fujikawa, Saitama (JP); Akihiro Nakashima, Tokyo (JP); Teruaki Honma, Tokyo (JP); Kenichi Yoshida, 2-232, Takao, Kitamoto-shi, Saitama (JP)

(73) Assignees: KDDI Corporation, Tokyo (JP); Kenichi Yoshida, Kitamoto-shi (JP)

( * ) Notice: Subject to any disclaimer, the term of this patent is extended or adjusted under 35 U.S.C. 154(b) by 1126 days.

(21) Appl. No.: 11/033,111

(22) Filed: Jan. 12, 2005

(65) Prior Publication Data

US 2005/0188032 A1 Aug. 25, 2005

(30) Foreign Application Priority Data

Jan. 14, 2004 (JP) ............................. 2004-006918

(51) Int. Cl.
G06F 15/16 (2006.01)
(52) U.S. Cl. ..................................... 709/206; 709/207
(58) Field of Classification Search ................. 709/206, 709/207; 707/687–704, 705–788
See application file for complete search history.

(56) References Cited

U.S. PATENT DOCUMENTS

| 6,460,050 | B1 | 10/2002 | Pace et al. | |
|---|---|---|---|---|
| 6,732,157 | B1* | 5/2004 | Gordon et al. | 709/206 |
| 6,842,773 | B1* | 1/2005 | Ralston et al. | 709/206 |
| 7,117,358 | B2* | 10/2006 | Bandini et al. | 713/153 |
| 2003/0182310 | A1* | 9/2003 | Charnock et al. | 707/104.1 |
| 2004/0064515 | A1* | 4/2004 | Hockey | 709/206 |
| 2004/0073617 | A1* | 4/2004 | Milliken et al. | 709/206 |
| 2004/0139098 | A1* | 7/2004 | Margolus et al. | 707/100 |
| 2004/0148280 | A1* | 7/2004 | Chimura | 707/3 |
| 2004/0177120 | A1* | 9/2004 | Kirsch | 709/206 |
| 2004/0221062 | A1* | 11/2004 | Starbuck et al. | 709/246 |
| 2005/0108340 | A1* | 5/2005 | Gleeson et al. | 709/206 |
| 2005/0131961 | A1* | 6/2005 | Margolus et al. | 707/200 |
| 2006/0031346 | A1* | 2/2006 | Zheng et al. | 709/206 |

FOREIGN PATENT DOCUMENTS

JP 2004-500761 1/2004

OTHER PUBLICATIONS

Raymond, E.S., "Bogofilter, VO.92.8 (0.93.5)," available at http://bogofilter.sourceforge.net/man_page.shtml.
Japanese Office Action dated Jan. 7, 2009, Application No. 2004-006918.
Mason, J., "Filtering Spam with SpamAssassin," available at http://spamassassin.apache.org/presentations/SAGE_IE_2002/ (Oct. 2002).

* cited by examiner

*Primary Examiner*—Saleh Najjar
*Assistant Examiner*—Edward J Kim
(74) *Attorney, Agent, or Firm*—Westerman, Hattori, Daniels & Adrian, LLP (57) ABSTRACT

The present invention is to provide a mass mail detection device that eliminates the need for preparation of rules or learning in advance and operates at a high speed. Electronic mail collecting means analyzes the electronic mail delivery protocol that flows on the network, and extracts an electronic mail main text from the electronic mail traffic that flows on the network. Next, characteristic quantity conversion means calculates a number of hash values from the electronic mail main text, as the characteristic quantity of the mail. Finally, mass mail detection means compares the newly received electronic mail with the stored past electronic mails, and determines the similarity in accordance with a specific standard. If determined as being similar, the new mail is determined as a candidate for a mass mail (similar mails), and a prescribed number or more of similar mails are determined as a mass mail.

11 Claims, 9 Drawing Sheets

(MAIL 4 IS SIMILAR TO MAIL 1 BECAUSE OF COINCIDENCE OF 75% OR MORE)

Fig. 10A

| | |
|---|---|
| h0 | |
| h1 | MAIL 1 |
| h2 | MAIL 1 |
| h3 | MAIL 1 |
| h4 | MAIL 1 |
| h5 | |
| h6 | |
| h7 | |
| h8 | |
| h9 | |

Fig. 10B

| | NUMBER OF SIMILAR MAIL | NUMBER OF RECEIVED DMC REFREENCE | HASH VALUE 1 | HASH VALUE 2 | HASH VALUE 3 | HASH VALUE 4 |
|---|---|---|---|---|---|---|
| MAIL 1 | 0 | 4 | h1 | h2 | h3 | h4 |
| | | | | | | |
| | | | | | | |
| | | | | | | |

Fig. 11A

| | |
|---|---|
| h0 | |
| h1 | MAIL 1 |
| h2 | MAIL 2 |
| h3 | MAIL 2 |
| h4 | MAIL 1 |
| h5 | |
| h6 | MAIL 2 |
| h7 | MAIL 2 |
| h8 | |
| h9 | |

Fig. 11B

| | NUMBER OF SIMILAR MAIL | NUMBER OF RECEIVED DMC REFREENCE | HASH VALUE 1 | HASH VALUE 2 | HASH VALUE 3 | HASH VALUE 4 |
|---|---|---|---|---|---|---|
| MAIL 1 | 0 | 2 | h1 | h2 | h3 | h4 |
| MAIL 2 | 0 | 4 | h2 | h3 | h6 | h7 |
| | | | | | | |
| | | | | | | |

Fig. 12A

| h0 | MAIL 3 |
|---|---|
| h1 | MAIL 1 |
| h2 | MAIL 2 |
| h3 | MAIL 2 |
| h4 | MAIL 3 |
| h5 |  |
| h6 | MAIL 2 |
| h7 | MAIL 2 |
| h8 | MAIL 3 |
| h9 | MAIL 3 |

Fig. 12B

|  | NUMBER OF SIMILAR MAIL | NUMBER OF RECEIVED DMC REFREENCE | HASH VALUE 1 | HASH VALUE 2 | HASH VALUE 3 | HASH VALUE 4 |
|---|---|---|---|---|---|---|
| MAIL 1 | 0 | 1 | h1 | h2 | h3 | h4 |
| MAIL 2 | 0 | 4 | h2 | h3 | h6 | h7 |
| MAIL 3 | 0 | 4 | h4 | h8 | h9 | h0 |
|  |  |  |  |  |  |  |

Fig. 13A

| h0 | MAIL 3 |
|---|---|
| h1 | MAIL 1 |
| h2 | MAIL 1 |
| h3 | MAIL 1 |
| h4 | MAIL 1 |
| h5 |  |
| h6 | MAIL 2 |
| h7 | MAIL 2 |
| h8 | MAIL 3 |
| h9 | MAIL 3 |

Fig. 13B

|  | NUMBER OF SIMILAR MAIL | NUMBER OF RECEIVED DMC REFREENCE | HASH VALUE 1 | HASH VALUE 2 | HASH VALUE 3 | HASH VALUE 4 |
|---|---|---|---|---|---|---|
| MAIL 1 | 1 | 4 | h1 | h2 | h3 | h4 |
| MAIL 2 | 0 | 2 | h2 | h3 | h6 | h7 |
| MAIL 3 | 0 | 3 | h4 | h8 | h9 | h0 |
|  |  |  |  |  |  |  |

MASS MAIL DETECTION SYSTEM AND MAIL SERVER

BACKGROUND OF THE INVENTION

1. Field of the Invention

The present invention relates to a spam processing of electronic mails, and more particularly to a mass mail detection system that is suitable when a dealer that manages a large-scale electronic mail server, such as a portable phone or an ISP, detects an annoying mail such as an unapproved advertisement contained in the electronic mails delivered via the electronic mail server, as well as to a mail server provided with the mass mail detection system.

2. Description of the Related Art

In accordance with the spread of electronic mails, there is an increasing number of annoying mails using electronic mail as transfer means, thereby raising a social problem. Conventionally, as means for preventing those annoying mails, a method such as described below has been generally used. Namely, the receiver of electronic mails prepares a mechanism for detecting an annoying mail in the terminal used for receiving the electronic mails, whereby the annoying mails are automatically deleted.

For example, SpamAssassin is a software that uses a rule base system, and bogofilter is a software that uses a mechanical learning method; both of which are used as an effective mechanism mainly among the PC users. Here, these softwares are shown respectively in the following documents 1 and 2.

Document 1:
http://www.au.spamassassin.org/presentations/SAGE_IE_2002/

Document 2:
http://bogofilter.sourceforge.net/bogofilter_man.html

The above-described conventional techniques presuppose that the receiver of electronic mails uses a receiving terminal having an information processing capability of a prescribed level or higher such as a PC, so that they are unsuitable for the receiving terminals having a comparatively low capability such as portable phones. In order to aid receiving terminals having a comparatively low capability such as portable phones, it is desirable that the mail server on the dealer side is provided with means for detecting a mass mail.

However, the above-described conventional techniques have a low processing speed for use in the server, thereby raising a problem in that large-scale equipment is needed. Further, it is difficult to prepare a common detection rule or mechanical learning result of mass mails for a large number of users, and also the cost for maintenance and management in coping with new types of spam has been huge, thereby raising a problem.

SUMMARY OF THE INVENTION

An object of the present invention is to provide a mass mail detection system that eliminates the need for preparation of rules or learning in advance and operates at a high speed, as well as a mail server provided with the mass mail detection system.

In order to achieve the object, the present invention is firstly characterized in that a mass mail detection system comprises electronic mail collecting means for collecting an electronic mail as an object of delivery, characteristic quantity conversion means for converting the collected electronic mail into a characteristic quantity, and mass mail detection means for detecting a mass mail by using the converted characteristic quantity, wherein the characteristic quantity conversion means extracts partial letter series from a main text of the electronic mail, and uses a set of values calculated from the partial letter series as the characteristic quantity, and the mass mail detection means determines the similarity of electronic mails based on the characteristic quantities and determines the similar electronic mails as a mass mail when a prescribed number or more of the similar electronic mails are detected.

The present invention is secondly characterized in that the mass mail detection means has means for preferentially storing electronic mails that are frequently delivered as electronic mails to be stored in a storage region, wherein the mass mail detection means uses a managed map cache system or LRU system.

According to the invention, the mass mail detection system can provided which is suitable when a dealer that manages a large-scale electronic mail server, such as a portable phone or an ISP, detects an annoying mail such as an unapproved advertisement contained in the electronic mails delivered via the electronic mail server.

DETAILED DESCRIPTION OF THE PREFERRED EMBODIMENT

Figure 1:
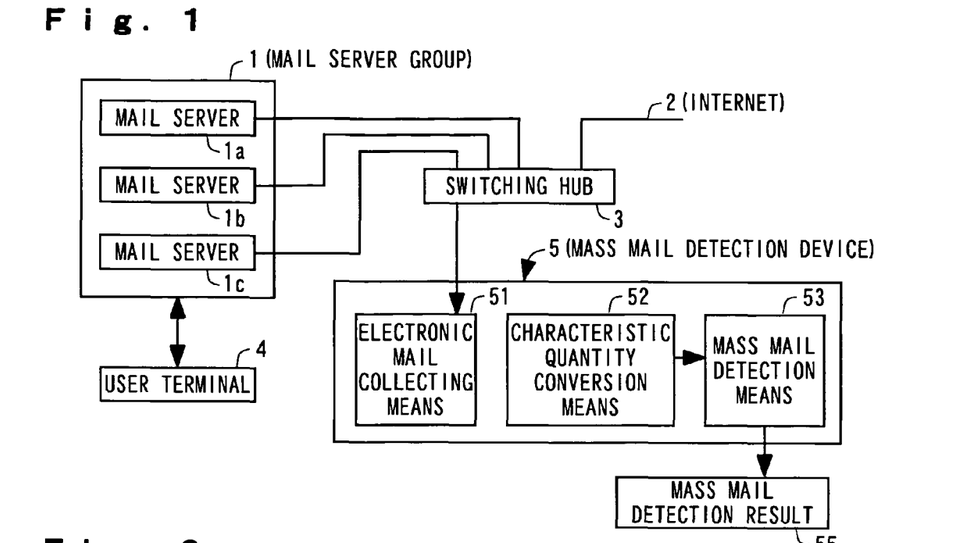
FIG. 1 is a block diagram illustrating a system construction including the present invention.

Hereafter, the present invention will be described in detail with reference to the attached drawings. FIG. 1 is a block diagram showing one example of a system construction to which the invention is applied.

FIG. 1 shows a mail server group 1, for example, of a communication dealer (provider), the internet 2, and a switching hub 3 that is used for data delivery among these, where the mail server group 1 is connected to a user terminal 4. A mass mail detection device 5 of the present invention is connected to switching hub 3.

In this embodiment, a mass mail is detected with the use of the mass mail detection device 5 from among the electronic mails that are delivered by using an SMTP protocol between the mail server group 1 and the internet 2.

The mass mail detection device 5 is constituted of an electronic mail collecting means 51, a characteristic quantity conversion means 52, and a mass mail detection means 53. The electronic mail collecting means 51 collects an electronic mail as an object of delivery, and may be a program on a suitable computer. The characteristic quantity conversion means 52 converts the electronic mail collected by the electronic mail conversion means 51 into a characteristic quantity, and may be a program on a suitable computer. The mass mail detection means 53 detects a mass mail by using the converted characteristic quantity, and may be a program on a suitable computer. The reference numeral 55 denotes a mass mail as a detection result.

Next, operation of this embodiment will be described. The electronic mail collecting means 51 analyzes an electronic mail delivery protocol that runs on a network, and extracts an electronic mail main text from an electronic mail traffic that runs on the network. Next, the characteristic quantity conversion means 52 calculates, for example, a number of hash values from the electronic mail main text, as the characteristic quantity of the mail. Finally, the mass mail detection means 53 compares the newly received electronic mail with the stored past electronic mails by using the characteristic quantity, and determines the similarity in accordance with a specific criterion. If determined as being similar, the new mail is determined as a candidate for a mass mail (similar mails) and, when a prescribed number or more of similar mails are detected, they are determined as a mass mail.

Figure 2:
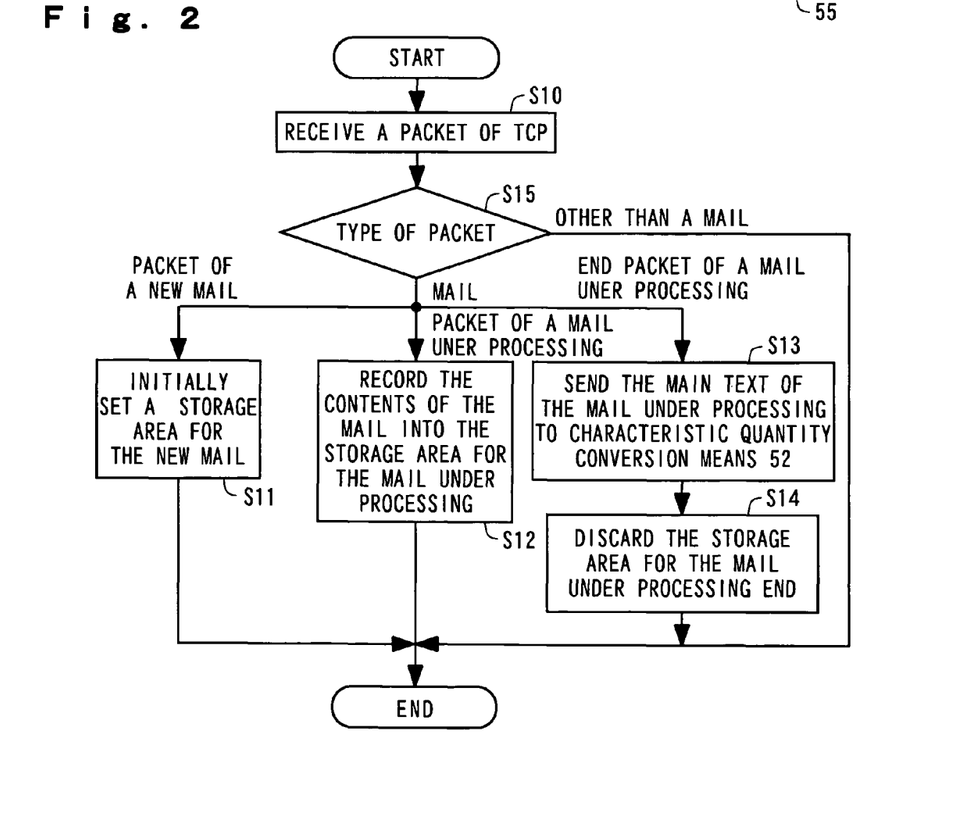
FIG. 2 is a flow chart showing one example of a processing procedure of electronic mail collecting means.

FIG. 2 is a flowchart showing one example of a processing procedure of the electronic mail collecting means 51. A plurality of mails are delivered in parallel between the mail server group 1 and the internet 2. Therefore, in step S10, the electronic mail collecting means 51 receives a TCP packet by monitoring at the switching hub 3. The received TCP packet contains mixed information of a plurality of electronic mails. In step S15, the electronic mail collecting means 51 determines the type of the packet. Namely, the electronic mail collecting means 51 determines whether the received packet is a mail or not and, if the packet is a mail, whether the received packet is a packet of a new mail, a packet of a mail under processing, or an end packet of a mail under processing.

If the received packet belongs to a new mail, the flow proceeds to step S11, where a storage region for a new mail is initially set. On the other hand, if the received packet is a packet that represents an end of a mail under processing, the flow proceeds to step S13, where the main text of the mail under processing is sent to characteristic quantity conversion means 52, and then the flow proceeds to step S14, where the storage region for the mail under processing is discarded/released. If the received packet is a mail packet under processing other than the end, the flow proceeds to step S12, where the contents of the mail contained in the TCP packet are recorded into the storage region for the mail under processing. If the received packet is determined as a packet other than a mail in the step S15, the flow ends without performing any process. In FIG. 2, the term "end" is used for the sake of convenience; however, it is clear that the actual process does not end, and the processes of steps S10 to S14 are continually repeated.

Figure 3:
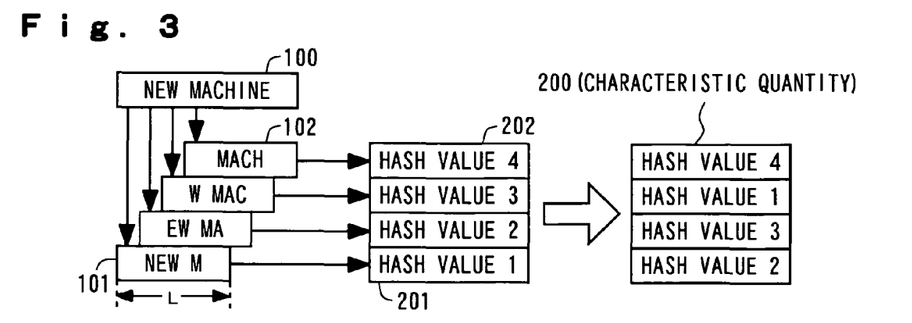
FIG. 3 is a descriptive view showing one example of a process of characteristic quantity conversion means.
Figure 4:
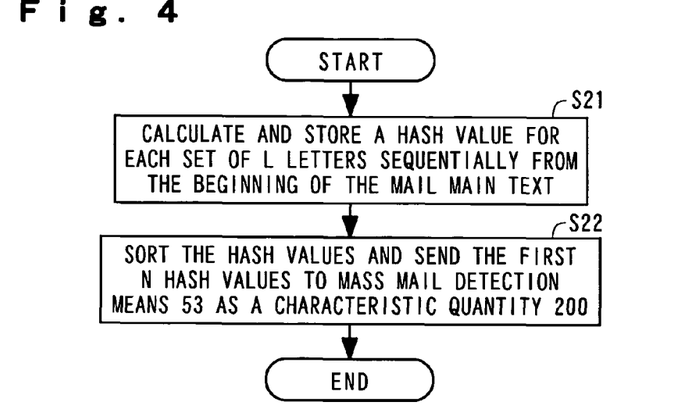
FIG. 4 is a flow chart showing one example of a processing procedure of characteristic quantity conversion means.

FIG. 3 is a descriptive view showing one example of a process of the characteristic quantity conversion means 52, and FIG. 4 is a flow chart showing one example of the processing procedure of the characteristic quantity conversion means 52.

In this embodiment, a set of hash values of a series of letters having a predefined length L (for example, four letters) is used as the characteristic quantity of the mail main text. Specifically, in accordance with the procedure of FIG. 4, first in step S21, series of successive L letters are sequentially take out from the beginning of mail main text 100, and the hash values thereof are calculated. Next, the flow proceeds to step S22, where the calculated hash values are sorted, and the first N hash values (for example, 100 hash values) are sent to mass mail detection means 53 as the characteristic quantity.

For example, supposing that the length L is four and the mail main text 100 is "new machine" as illustrated in FIG. 3, the hash values 201 to 202 of "new m" (101 of FIG. 3), "ew ma", "w mac", "mach" (102 of FIG. 3), and so on are calculated (step S21 of FIG. 4). Subsequently, after the hash values 201 to 202 are sorted, the first N hash values are sent to the mass mail detection means 53 as the characteristic quantity 200 (step S22 of FIG. 4). The hash values can be represented, for example, by integers of 64 bits.

Figure 5:
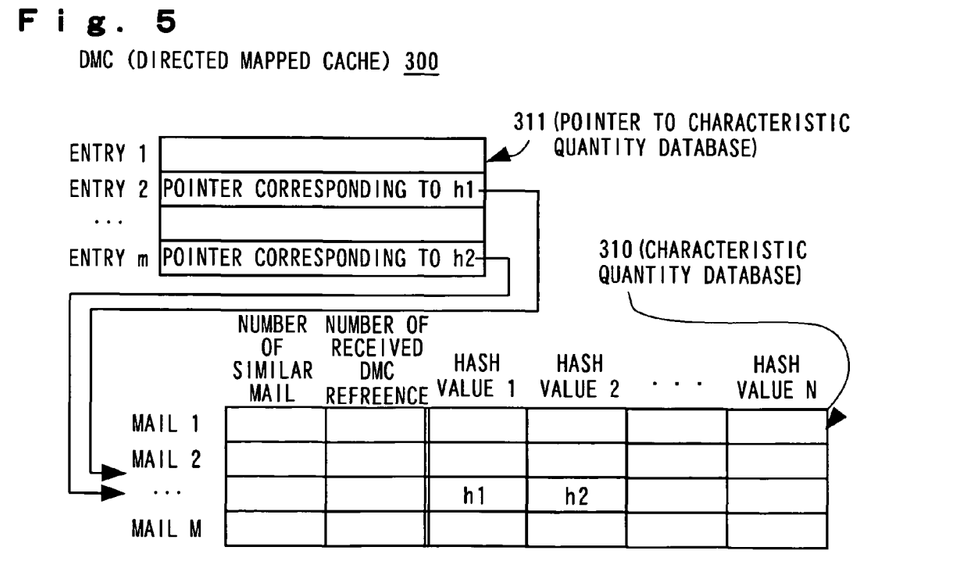
FIG. 5 shows a Directed Mapped Cache as one example of a data structure that mass mail detection means uses.

FIG. 5 is an example of a data structure that the mass mail detection means 53 uses. The reference numeral 300 denotes a data structure, i.e. a managed map cache system (hereafter referred to as DMC or Directed Map Cache), for preferentially storing frequently delivered electronic mails in a characteristic quantity database 310. The DMC 300 has a characteristic quantity database 310 and a pointer 311 to the characteristic quantity database 310. Characteristic quantity database 310 is a data structure on a computer that stores the characteristic quantity (hash values 1 to N), the number of mails similar to the electronic mail, and the number of pointers that refer to the mail (number of received DMC references) among the entries of pointer 311. Each of pointer 311 can be represented, for example, in 64 bits.

When the electronic mail collecting means 51 extracts an electronic mail, the characteristic quantity conversion means 52 calculates a characteristic quantity 200 (See FIG. 3) from the main text of the electronic mail. Finally, according to the procedure exemplified in FIG. 6, the mass mail detection means 53 detects similar mails that are delivered in a large quantity as a mass mail. Specifically, for one electronic mail, the characteristic quantity 200 calculated by characteristic quantity conversion means 52 has N hash values (N is a positive integer). For each mail, the mass mail detection means 53 repeats the processes from step S31 to step S41 for at most N times according to the procedure of FIG. 6.

In step S30, on the basis of the characteristic quantity 200, whether or not there is already a mail similar to the electronic mail collected by the electronic mail collecting means 51 is determined. One specific example of this process will be described with reference to the flowchart of FIG. 7.

Figure 7:
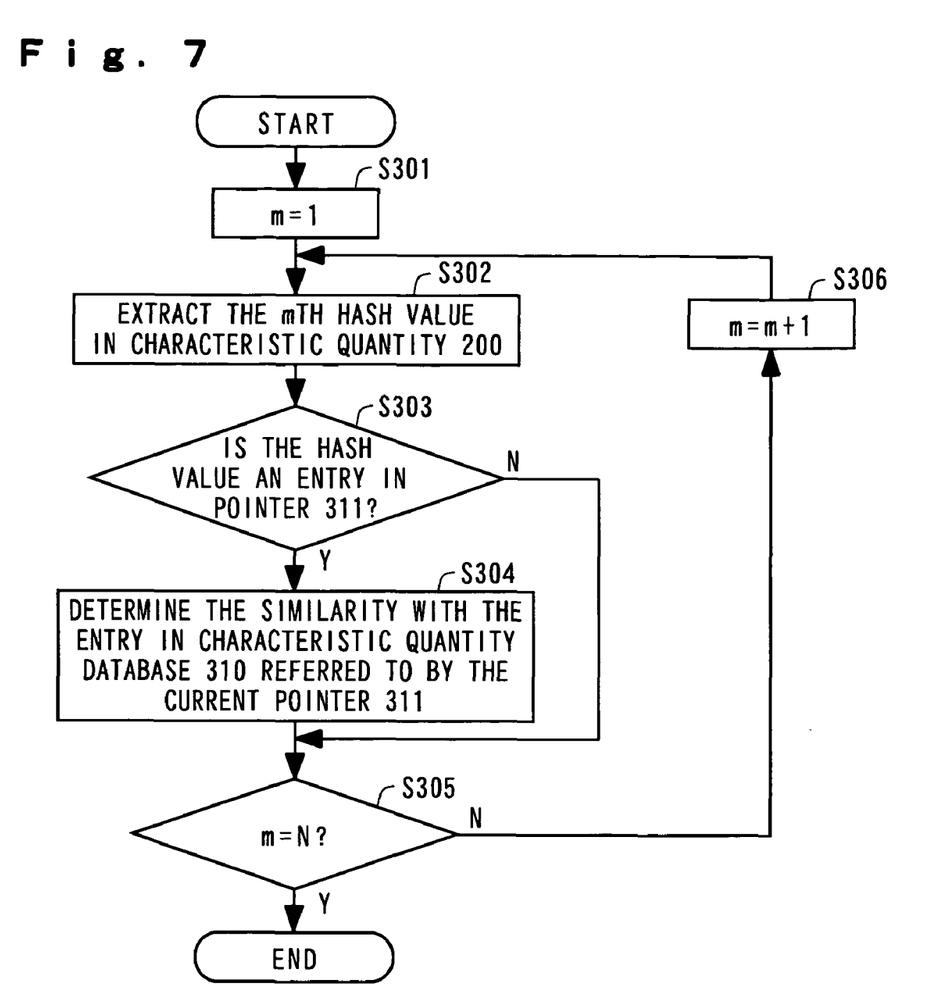
FIG. 7 is a flow chart showing one concrete example of step S30 of FIG. 6.

In step S301, the number m representing the number of the characteristic quantity 200 is set to be 1 and, in step S302, the mth hash value within the characteristic quantity 200 of the new mail is extracted. In step S303, whether the hash value is registered in pointer 311 or not is determined. If this determination is affirmative, the flow proceeds to step S304, where the similarity with an entry in characteristic quantity database 310 referred to by the current pointer 311 is determined. Then, if a similarity of 80%, for example, is determined, the new mail is determined as a similar mail, whereas if the similarity is smaller than 80%, the new mail is determined as a non-similar mail. In step S305, whether m=N holds or not is determined and, if the determination is negative, the flow proceeds to step S306, where m is increased by one. Next, the flow returns to step S302, where the second hash value is extracted. Thereafter, the above-described process is repeatedly carried out in a similar manner and, when the determination of step S305 turns to be affirmative, the process of the step S30 is ended.

The determination of similarity in step S304 is carried out, for example, by using the number of coincidences between the hash values 200 (See FIG. 3) of the new electronic mail and the hash values within the characteristic quantity database 310. For example, if the number N of the characteristic quantity is 100 and the threshold for similarity is 80%, a new mail having 80 coincident hash values is determined as a similar mail. In order to raise the speed of the process for measuring the number of coincidences, the hash values are preferably sorted in advance. Here, in FIG. 7, the similarity is determined with respect to N hash values; however, it is not necessary to determine the similarity with respect to N hash values, so that the similarity may be determined with respect to less than N hash values.

For continuation of the description by returning to FIG. 6, in step S31, the aforesaid number m is set again to be m=1 and, in step S32, the mth hash value within the characteristic quantity 200 is extracted. Subsequently, the flow proceeds to step S33, and whether the mth hash value is a hash value of a similar mail or not is determined. If this determination is negative, i.e. if the new electronic mail is a non-similar mail, since a similar mail is not stored in the characteristic quantity database 310, the flow proceeds to step S34, where the characteristic quantity of the new mail is registered as a new entry in the characteristic quantity database 310. Specifically, the characteristic quantity 200 (See FIG. 3) of the new electronic mail is stored as hash value 1 to hash value N in the characteristic quantity database 310. Next, the flow proceeds to step S35, where the contents of DMC 300 are renewed with the vector value of the characteristic quantity.

Figure 6:
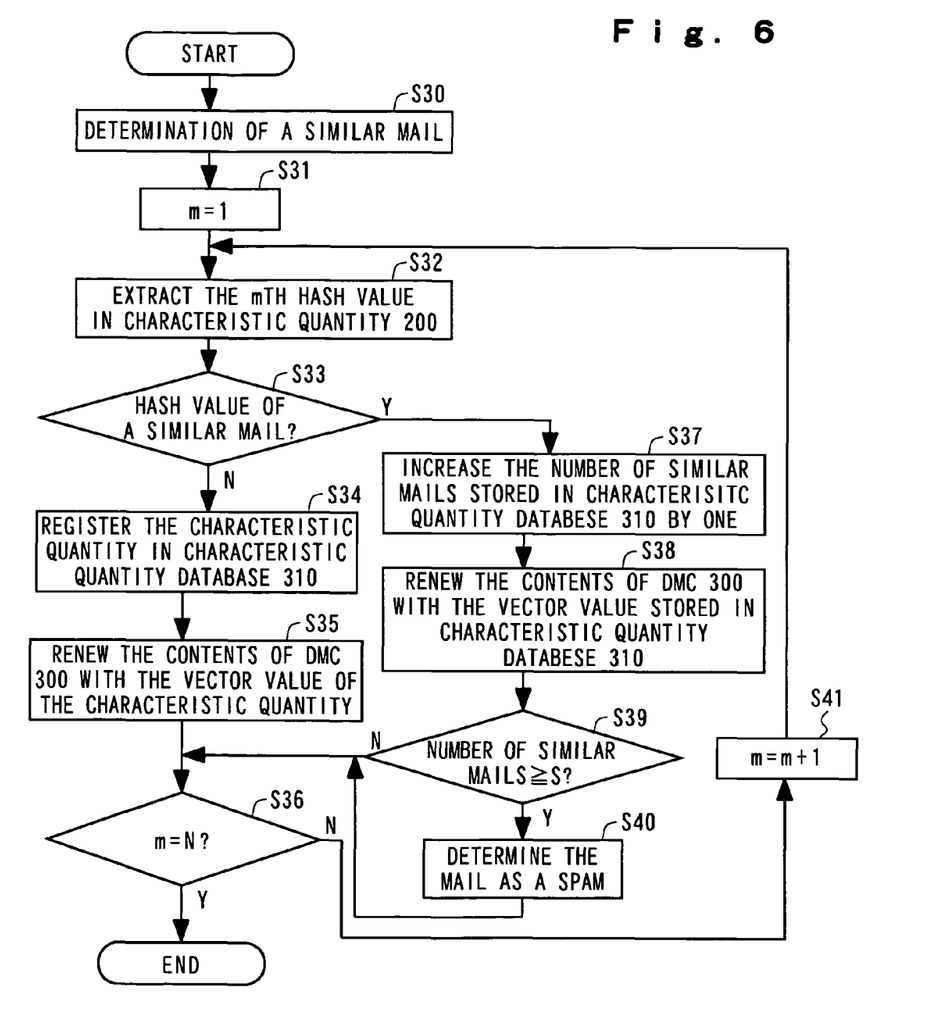
FIG. 6 is a flow chart showing one example of a process of mass mail detection means.

If the determination of step S33 is affirmative, i.e. if a similar mail is present, the flow proceeds to step S37. In the step S37, the number of similar mails (See FIG. 5) of the mail already stored in the characteristic quantity database 310 is increased by one. Next, the flow proceeds to step S38, where the contents of DMC 300 are renewed with the vector value stored in the characteristic quantity database 310. Here, the step S38 is a process identical to the step S35, and a concrete example thereof will be described later with reference to FIG. 8.

In step S39, whether or not the number of similar mails has reached a prescribed number S or more is determined and, if the number has reached S or more, the flow proceeds to step S40, where the mail is determined as a spam. On the other hand, if the determination of step S39 is negative, the flow proceeds to step S36. In step S36, whether or not m=N holds or not is determined and, if this determination is negative, the flow proceeds to step S41, where m is increased by one. Then, the operation from step S32 is repeated again.

Figure 8:
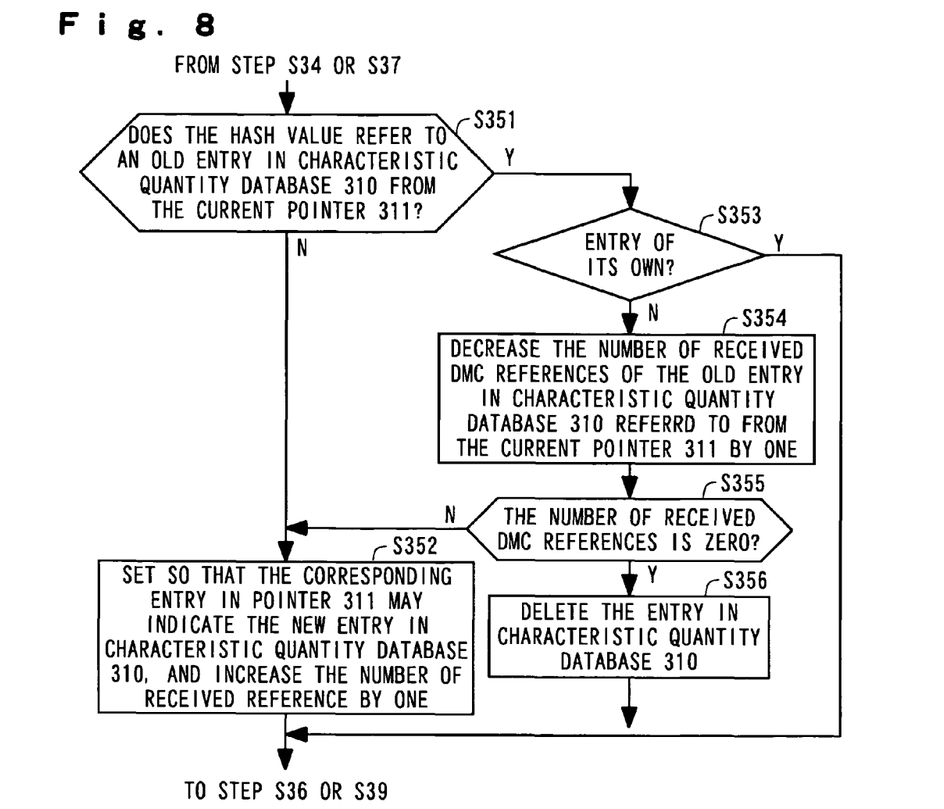
FIG. 8 is a flow chart showing one concrete example of steps S35 and S38 of FIG. 6.

FIG. 8 exemplifies the procedure of the DMC renewal process of steps S35 and S38 in FIG. 6. In processing each electronic mail, the mass mail detection means 53 carries out the determination of step S351. Namely, whether or not the hash value refers to an old entry in the characteristic quantity database 310 from the current pointer 311 is determined. If this determination is negative, the flow proceeds to step S352, where it is set so that the corresponding entry in pointer 311 may indicate the new entry in the characteristic quantity database 310, and the number of received references in the characteristic quantity database 310 is increased by one.

On the other hand, if the determination of step S351 is affirmative, i.e. if the hash value refers to an old entry in the characteristic quantity database 310 from the current pointer 311, the flow proceeds to step S353, where whether the hash value refers to the entry of its own or not is determined. Namely, whether the hash value is contained in the similar mail or not is determined. If this determination is affirmative, the flow escapes to the process of FIG. 6 without performing any process.

If the determination of step S353 is negative, i.e. if the hash value is not contained in the similar mail, the flow proceeds to step S354, where the number of received DMC references of the old entry in the characteristic quantity database 310 referred to by the current pointer 311 is decreased by one. Subsequently, the flow proceeds to step S355, where whether the number of received DMC references is zero or not is determined. If this determination is affirmative, the flow proceeds to step S356, where the entry of the past mail whose number of received DMC references has become zero is deleted from the characteristic quantity database 310. If the determination of step S355 is negative, the flow proceeds to step S352, where it is set so that the corresponding entry in pointer 311 may indicate the new entry in the characteristic quantity database 310, and the number of received references in the characteristic quantity database 310 is increased by one.

According to the above-described process, a mail having a lot of similar mails is frequently invoked from step S38 of FIG. 6, whereby the renewal process of FIG. 8 (more specifically, step S352) is performed, so that the number of received DMC references is not likely to become zero. On the other hand, a mail having no similar mails will have a decreasing number of received DMC references with lapse of time because the data having a coincident hash value are overwritten, and the mail is eventually deleted in step S356.

Figure 9:
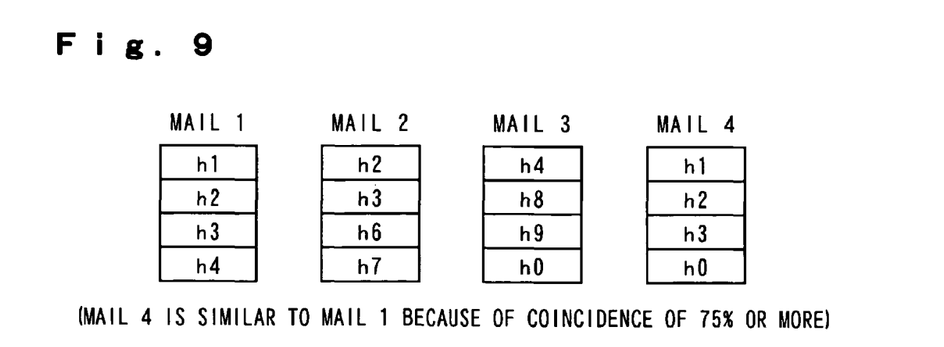
FIG. 9 is a descriptive view of the characteristic quantities of mails 1, 2, 3, and 4 that are sequentially extracted.

Next, a concrete example of the operation of FIGS. 6 to 8 will be described with reference to FIGS. 9 to 13. It is now supposed that new mails are collected via the internet in the order of mails 1, 2, 3, and 4 as shown in FIG. 9 and, with regard to the characteristic quantity of the mails (the characteristic quantity 200 of FIG. 3), mail 1 has hash values h1, h2, h3, and h4; mail 2 has hash values h2, h3, h6, and h7; mail 3 has hash values h4, h8, h9, and h0; and mail 4 has hash values h1, h2, h3, and h0. Here, if the criterion for determining a similar mail is supposed to be a coincidence of 75% or more, mail 4 is similar to mail 1. This determination is carried out by the process of FIG. 7. Here, for simplification of the description, each mail is supposed to have four characteristic quantities.

Figure 10A:
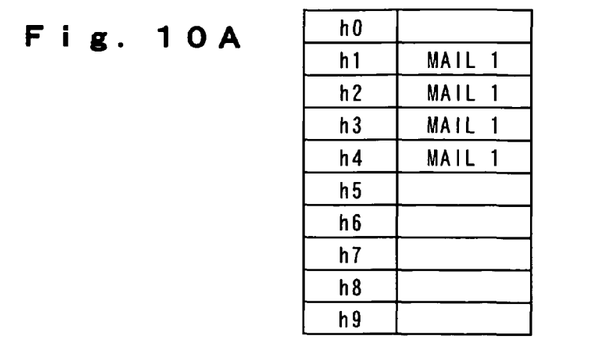
FIGS. 10A and 10B are descriptive views showing a data example of Directed Mapped Cache for mail 1.
Figure 10B:
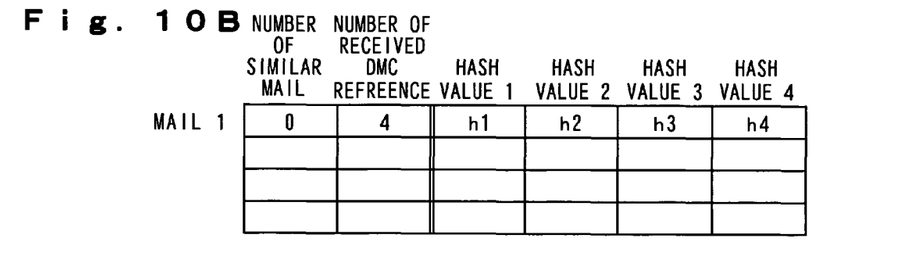

Now, when mail 1 is extracted via the internet, the determination of step S33 of FIG. 6 is negative, so that the processes of steps S34 will be carried out. By the process of step S34, h1 to h4 will be registered in the hash values 1 to 4 as shown in FIG. 10B in the characteristic quantity database 310. By the process of step S35, the pointer 311 of DMC 300 will be as shown in FIG. 10A, and the number of received DMC references will be 4.

Figure 11A:
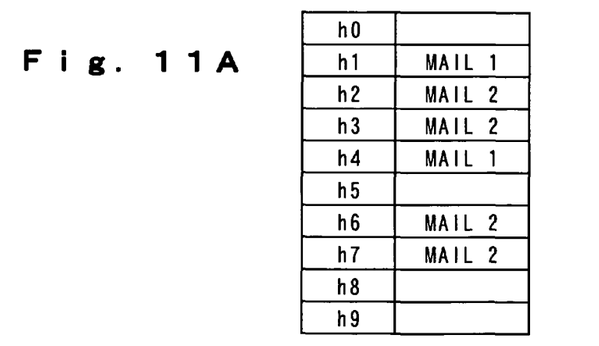
FIGS. 11A and 11B are descriptive views showing a data example of Directed Mapped Cache for mails 1 and 2.
Figure 11B:
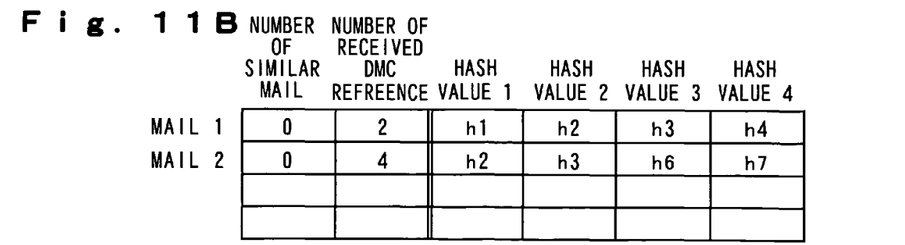

Next, when mail 2 is extracted, the determination of step S33 will be negative, so that the flow proceeds to the processes of steps S34 and S35. By the process of step S34, h2, h3, h6, and h7 will be registered in the hash values 1 to 4 of mail 2 as shown in FIG. 11B in the characteristic quantity database 310. By the process of step S35, the pointer 311 of DMC 300 will be as shown in FIG. 11A, and the number of received DMC references of mail 2 will be 4, whereas the number of received DMC references of mail 1 will be 2.

Figure 12A:
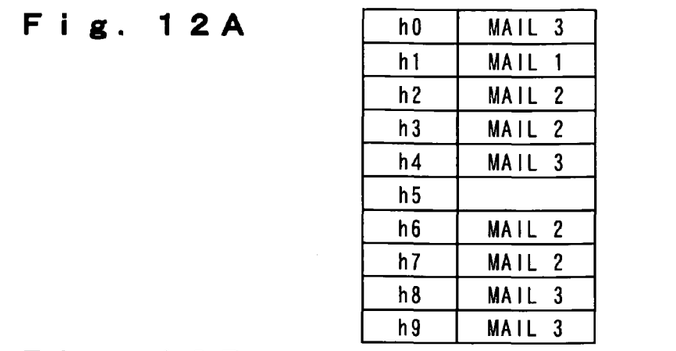
FIGS. 12A and 12B are descriptive views showing a data example of Directed Mapped Cache for mails 1, 2, and 3.
Figure 12B:
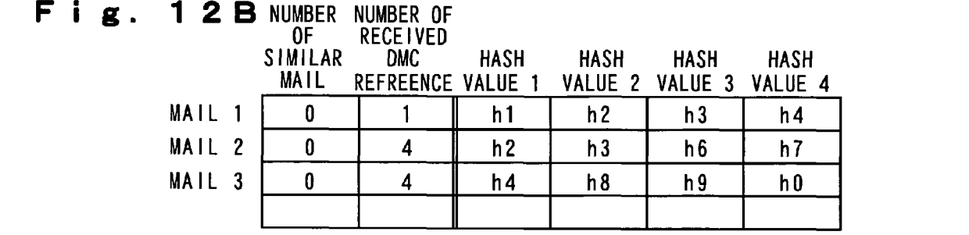

Subsequently, when mail 3 is extracted, the determination of step S33 will be negative, so that the processes of steps S34 and S35 will be carried out. By the process of step S34, h4, h8, h9, and h0 will be registered in the hash values 1 to 4 of mail 3 as shown in FIG. 12B in the characteristic quantity database 310. By the process of step S35, the pointer 311 of DMC 300 will be as shown in FIG. 12A, and the number of received DMC references of mails 1, 2, and 3 will be 1, 4, and 4, respectively.

Figure 13A:
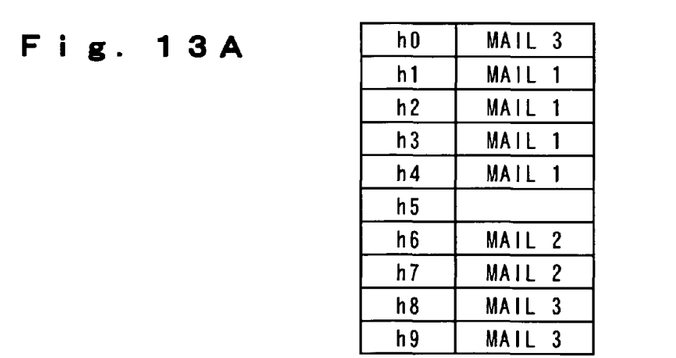
FIGS. 13A and 13B are descriptive views showing a data example of Directed Mapped Cache for mails 1, 2, 3, and 4.
Figure 13B:
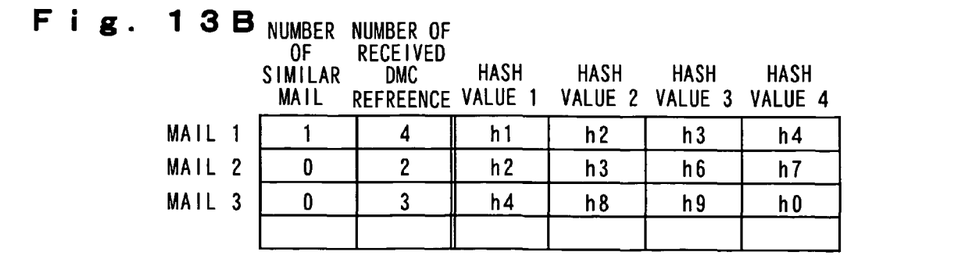

Further, when mail 4 is extracted, since this mail 4 is similar to the already registered mail 1, the determination of step S33 will be affirmative, so that the processes of steps S37 and S38 will be carried out. By the process of step S37, the number of similar mails of mail 1 in the characteristic quantity database 310 is increased by one, and will be as shown in FIG. 13B. By the process of step S38, the pointer 311 of DMC 300 will be as shown in FIG. 13A, and the number of received DMC references of mail 1, 2, and 3 will be 4, 2, and 3, respectively.

In other words, when a similar mail arrives, the number of similar mails of mail 1 will be increased by one in step S37. Next, by the process of step S38, i.e. by the process of FIG. 8, since pointer 31 for the hash value h1 indicates its own mail 1, the determination of step S353 will be affirmative, and the flow escapes from the process of FIG. 8. For the next hash values h2 and h3, since both of the pointers indicate mail 2, the determination of step S353 will be negative, and the flow proceeds to the processes of step S354 and so on. Then, in step S354, the number of received DMC references of mail 2 is decreased by one and, in step S352, the number of received DMC references of mail 1 is increased by one. For the next hash value h0, a similar process is carried out.

In the above-described manner, a mail having a lot of similar mails is frequently invoked from step S38 of FIG. 6, and the renewal process of FIG. 8 is invoked to increase the number of received DMC references. On the other hand, as will be clear by seeing mail 2, a mail having no similar mails will have a decreasing number of received DMC references with lapse of time because the data having a coincident hash value are overwritten.

Figure 15:
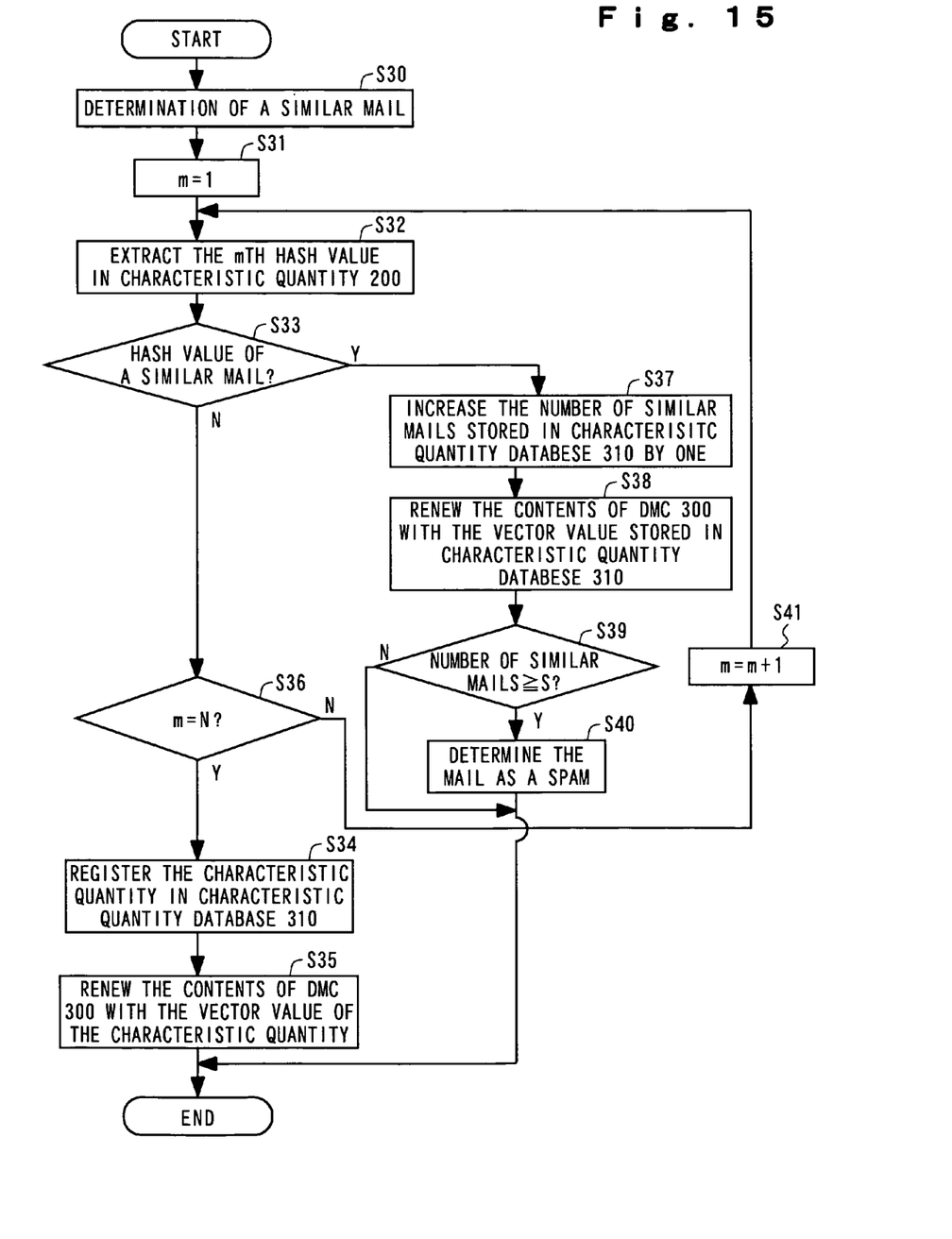
FIG. 15 is a flowchart showing an other example of the process of mass mail detection means.

Here, the present invention is not limited to the above-described embodiment, and FIG. 6 can be modified to FIG. 15. In FIG. 15, if the determination of step S36 is positive, the flow proceeds to step S34 and then step S35. Furthermore, after step S35 or S40, or if the determination of step S39 is negative, the procedure of FIG. 15 is ended. In the above-described embodiment, the electronic mail collecting means 51 collects electronic mails flowing on the network by monitoring at the switching hub 3; however, the software of the mail server may be changed so that the mail server may send the mails as an object of delivery directly to the characteristic quantity conversion means 52. Further, though the delivery protocol of the mails is assumed to be SMTP, other delivery modes such as a www mail using HTTP may be employed instead.

Furthermore, when the mail server sends mails as an object of delivery to the characteristic quantity conversion means 52, a mail already determined as a spam may be sent together with a mark indicating a spam and, by using the information, the mass mail detection means 53 may determine a mail similar to the mail having the mark immediately as a spam. Also, the mail server may be constructed to include up to the characteristic quantity conversion means 52 so that the characteristic quantity converted by the characteristic quantity conversion means 52 may be sent to the mass mail detection means 53 via the network.

In the above-described embodiment, the mass mail detection means 53 uses DMC 300 (See FIG. 5) as a mechanism for preferentially storing the frequently delivered electronic mails in the storage region; however, another mechanism such as an LRU system may be employed instead. When using the LRU, specifically, an LRU list for managing the entries in the characteristic quantity database 310 is prepared, and the processes up to transferring the entry of characteristic quantity database 310 as an object of processing in step S37 (See FIG. 6) to the head position of the LRU are included in step S37. Further, the storage region needed in making a new entry in the characteristic quantity database 310 in step S34 is created by discarding the last entry in the LRU, and the new entry is added to the head of LRU.

In the above-described embodiment, the preprocessing of the characteristic quantity conversion means 52 has not been described; however, a preprocessing means may be provided between the electronic mail collecting means 51 and the characteristic quantity conversion means 52 of FIG. 1. This preprocessing means may be means for extracting a series of letters, and this preprocessing means may extract mail addresses, telephone numbers, and the like. Further, it may be means that performs some other preprocessing. This preprocessing may be carried out in accordance with the mode in which the electronic mails are displayed to a receiver. This preprocessing may select the letters that are displayed in the beginning part of the terminal of the receiver (for example, first two pages) as an object of processing. The mode assumed here may be, for example, processing of HTML or MIME that affects the display; however, it may be other than that. Also, it may be a mechanism such that the large-case letters and the small-case letters, the two-byte letters and the one-byte letters, and the like are dealt with as similar letters in displaying so that the same characteristic quantity may be calculated (for example, having a mechanism such that all the two-byte letters are converted to one-byte letters in advance).

In the above-described embodiment, the hash values of the series of letters contained in the electronic mail main text were used as a characteristic quantity; however, other characteristic quantities such as the bygram or the term frequency may be employed instead.

FIG. 14 is a block diagram illustrating a construction of another embodiment of the present invention, showing a construction example in which the present invention is incorporated in a mail server. Here, in FIG. 14, parts identical or equivalent to those in FIG. 1 are denoted with the same reference numerals, and the description overlapping with that of FIG. 1 will be omitted.

Figure 14A:
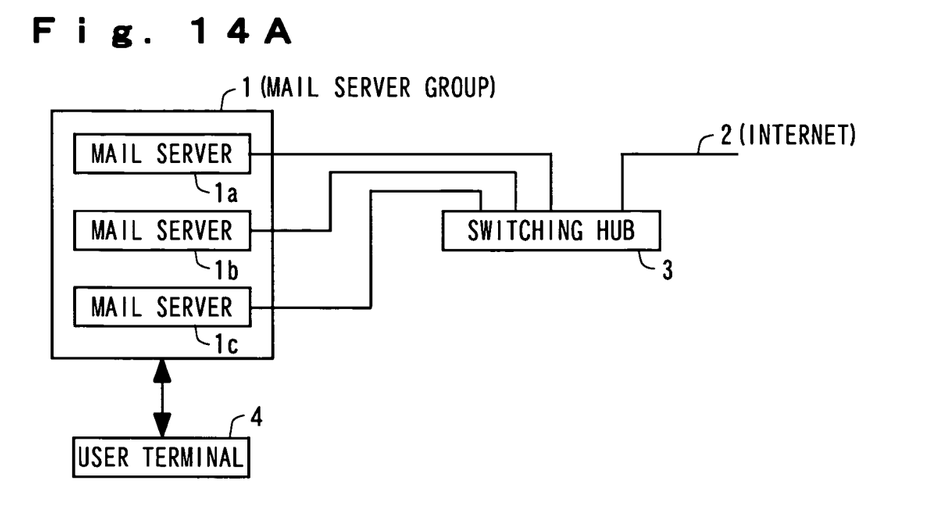
FIGS. 14A and 14B are block diagrams showing an essential part of another embodiment of the present invention.
Figure 14B:
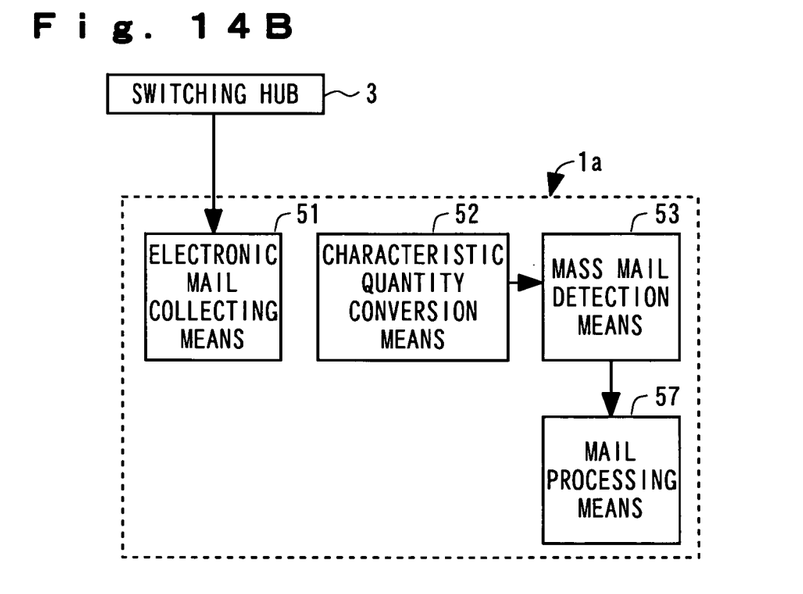

Assuming that a mail server group 1 of FIG. 14A is constituted of a plurality of mail servers 1a, 1b, 1c, and the like, this embodiment is characterized in that the electronic mail collecting means 51, the characteristic quantity conversion means 52, the mass mail detection means 53 and the mail processing means 57 are incorporated in each of mail servers 1a, 1b, and 1c, as shown in FIG. 14B.

In this embodiment, the detection result of whether a mail is a mass mail or not is sent to the mail processing means 57. The processes carried out by the mail processing means 57 are deletion of the mail, display of mass mails to mail caption part, and so on based on the mass mail detection result. Further, the processes may include informing the mail server manager of the mass mail.

As will be clear from the above description, the present invention eliminates the need for preparation of rules or learning in advance. Also, by simply comparing the characteristic quantities of the electronic mails, similar mails can be detected, and a mail having a prescribed number or more of similar mails is determined as a mass mail, so that the mass mail detection operation can be carried out at a high speed.

What is claimed is:

1. A mass mail detection system comprising:
electronic mail collecting means for collecting an electronic mail as an object of delivery;
characteristic quantity conversion means for converting the collected electronic mail into a characteristic quantity; and
mass mail detection means for detecting a mass mail by using the converted characteristic quantity,
wherein the characteristic quantity conversion means extracts a partial letter series from a main text of the electronic mail, and uses a set of values calculated from the partial letter series as the characteristic quantity, and
wherein the mass mail detection means uses a managed map cache system including a characteristic quantity database and a pointer to the characteristic quantity database as a means for storing electronic mails that are frequently delivered, the characteristic quantity database storing a registered electronic mail and an indicator associated with the registered electronic mail, the indicator indicating a number of newly received electronic mails that have been determined to be similar to the registered electronic mail,
wherein the mass mail detection means determines that a newly received electronic mail and the registered electronic mail stored in the characteristic quantity database are similar by making an access to the characteristic quantity database using a pointer corresponding to a characteristic quantity of the newly received electronic mail and making a comparison between the characteristic quantity of the newly received electronic mail and a characteristic quantity of the electronic mail registered in the characteristic quantity database, and
wherein when the mass mail detection means determines that the newly received electronic mail is similar to the electronic mail registered in the characteristic quantity database based on the comparison between the characteristic quantity of the newly received electronic mail and the characteristic quantity of the electronic mail registered in the characteristic quantity database, the mass mail detection means increases the indicator of the number of newly received electronic mails that are similar to the electronic mail registered in the characteristic quantity database by one and stores the indicator in the characteristic quantity database, and the mass mail detection means determines that the newly received electronic mail is the mass mail when the indicator indicates that the number of newly received electronic mails that are similar to the electronic mail registered in the characteristic quantity database is at least a prescribed number.

2. The mass mail detection system of claim 1, wherein the characteristic quantity database registers a number of electronic mails received that are similar to the electronic mail already stored in the characteristic quantity database, a number of received references referred to by the pointer, and hash values of electronic mails, and
when the electronic mail that is similar to the electronic mail already stored in the characteristic quantity database is received, the number of received references increases in accordance with a number of coincident hash values in the received electronic mail that is similar to the electronic mail already stored in the characteristic quantity database and the electronic mail already stored in the characteristic quantity database.

3. The mass mail detection system of claim 1, wherein the characteristic quantity conversion means performs preprocessing of an electronic mail.

4. The mass mail detection system of claim 3, wherein the characteristic quantity conversion means selects letters that are displayed in a beginning part of a terminal of the receiver when the characteristic quantity conversion means performs preprocessing of the electronic mail.

5. The mass mail detection system of claim 3, wherein similar letters are dealt with as identical letters when the characteristic quantity conversion means performs preprocessing of the electronic mail.

6. The mass mail detection system of claim 3, wherein the preprocessing includes an HTML processing when the characteristic quantity conversion means performs preprocessing of the electronic mail.

7. The mass mail detection system of claim 3, wherein the preprocessing includes an MIME processing when the characteristic quantity conversion means performs preprocessing of the electronic mail.

8. The mass mail detection system of claim 3, wherein a two-byte letter and a one-byte letter are dealt with as the similar letters when the characteristic quantity conversion means performs preprocessing of the electronic mail.

9. The mass mail detection system of claim 3, wherein a large-case letter and a small-case letter are dealt with as the similar letters when the characteristic quantity conversion means performs preprocessing of the electronic mail.

10. The mass mail detection system of any one of claims 1 and 3 to 9, wherein the mass mail detection system is provided as part of a mail server.

11. The mass mail detection system of claim 2, wherein the mass mail detection system is provided as part of a mail server.

* * * * *